United States Patent

Burtea et al.

[11] Patent Number: 5,154,160
[45] Date of Patent: Oct. 13, 1992

[54] AUTOMATED OVEN WITH GAS-FIRED RADIANT HEATER ASSEMBLY

[75] Inventors: Constantin Burtea, Oak Brook; Georg D. Nuber, Inverness, both of Ill.

[73] Assignee: Q Industries Food Equipment Co., Arlington Heights, Ill.

[21] Appl. No.: 700,598

[22] Filed: May 12, 1991

[51] Int. Cl.⁵ ............................ A21B 1/00; A23L 3/00
[52] U.S. Cl. .................................. 126/21 A; 126/39 J; 99/443 C; 99/447; 431/31; 431/328
[58] Field of Search ............... 431/326, 328, 329, 354, 431/3, 6, 7, 23, 29, 30, 31, 346; 126/91 R, 39 D, 21 R, 21 A, 39 J, 92 R, 92 A, 19 R; 432/152, 124; 99/443 C, 451, 386, 331

[56] References Cited

U.S. PATENT DOCUMENTS

| | | | |
|---|---|---|---|
| 3,330,267 | 7/1967 | Bauer | 126/92 R |
| 3,366,156 | 1/1968 | Belknap | 126/92 R |
| 3,391,983 | 7/1968 | Harazono et al. | 431/329 |
| 3,529,916 | 9/1970 | Krieger | 431/329 |
| 3,547,097 | 12/1970 | Rice et al. | 126/92 R |
| 3,721,178 | 3/1973 | Szabrak et al. | 126/41 C |
| 3,917,445 | 11/1975 | Suva et al. | 432/124 |
| 4,140,100 | 2/1979 | Ishihara | 126/92 B |
| 4,269,590 | 5/1981 | Baumanns | 431/328 |
| 4,370,126 | 1/1983 | Miyanaka et al. | 431/31 |
| 4,437,833 | 3/1984 | Mertz | 431/329 |
| 4,547,148 | 10/1985 | Holmer | 431/328 |
| 4,554,437 | 11/1985 | Wagner et al. | 99/443 C |
| 4,576,090 | 3/1986 | Burtea | 126/21 A |
| 4,591,333 | 5/1986 | Henke | 126/21 A |
| 4,597,734 | 7/1986 | McCausland et al. | 431/328 |
| 4,599,066 | 7/1986 | Granberg | 431/329 |
| 4,727,854 | 3/1988 | Johnson | 126/92 B |
| 4,739,154 | 4/1988 | Bharara et al. | 99/443 C |
| 4,782,814 | 11/1988 | Cherryholmes | 126/92 B |
| 4,798,192 | 1/1989 | Maruko | 126/91 A |
| 4,805,588 | 2/1989 | Reynolds | 126/41 A |
| 4,810,587 | 3/1989 | Losfeld et al. | 431/328 |
| 4,881,519 | 11/1989 | Henke | 126/21 A |
| 4,927,355 | 5/1990 | Haire et al. | 431/329 |
| 4,951,648 | 8/1990 | Shukla et al. | 126/21 A |
| 4,976,609 | 12/1990 | Grob | 431/328 |

*Primary Examiner*—James C. Yeung
*Attorney, Agent, or Firm*—Dressler, Goldsmith, Shore, Sutker & Milnamow, Ltd.

[57] ABSTRACT

An automated conveyorized oven includes a radiant heater assembly including a plurality of gas-fired radiant heaters positioned beneath the oven conveyor. Each heater assembly includes radiant heating elements in the form of perforate metallic plates, at the outer surface of which combustion takes place for elevating the temperature of the plates for generating radiant heat. Consistent and reliable operation is promoted by the provision of a control arrangement which acts to preclude flashback combustion upstream of the surface of the metallic heating elements, with the controls being operable to permit sufficient time for the heating elements to cool, after interruption of the gas supply thereto, before gas is resupplied to the heater units.

6 Claims, 5 Drawing Sheets

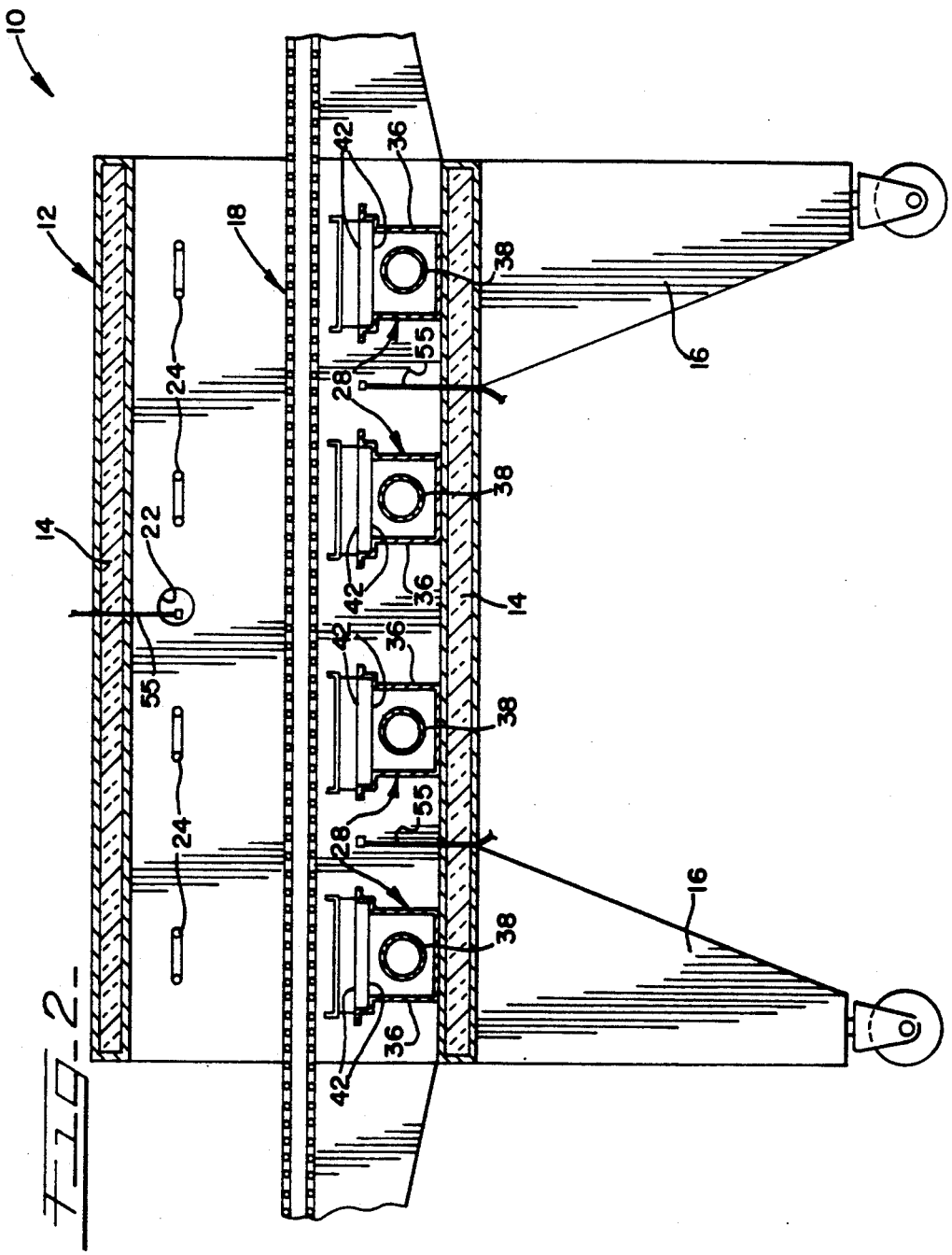

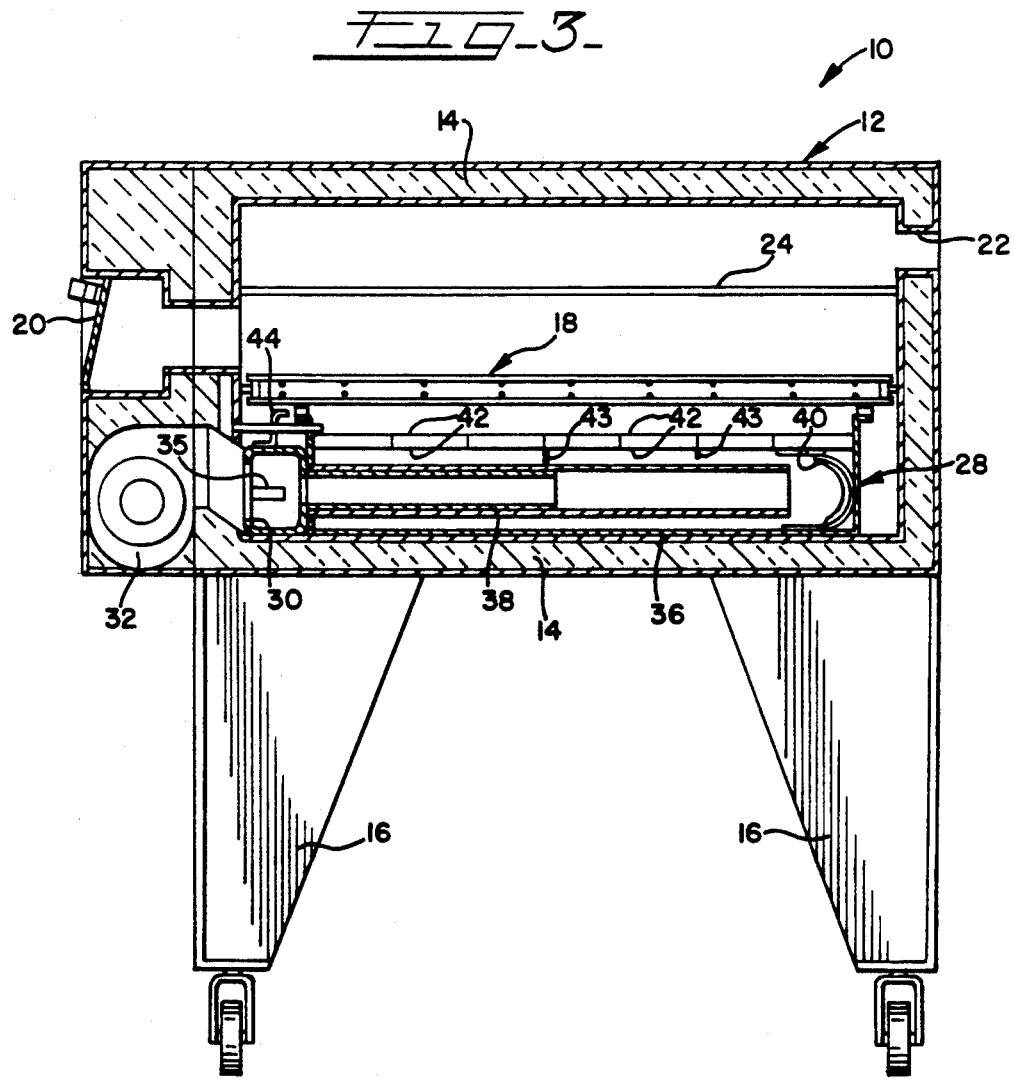

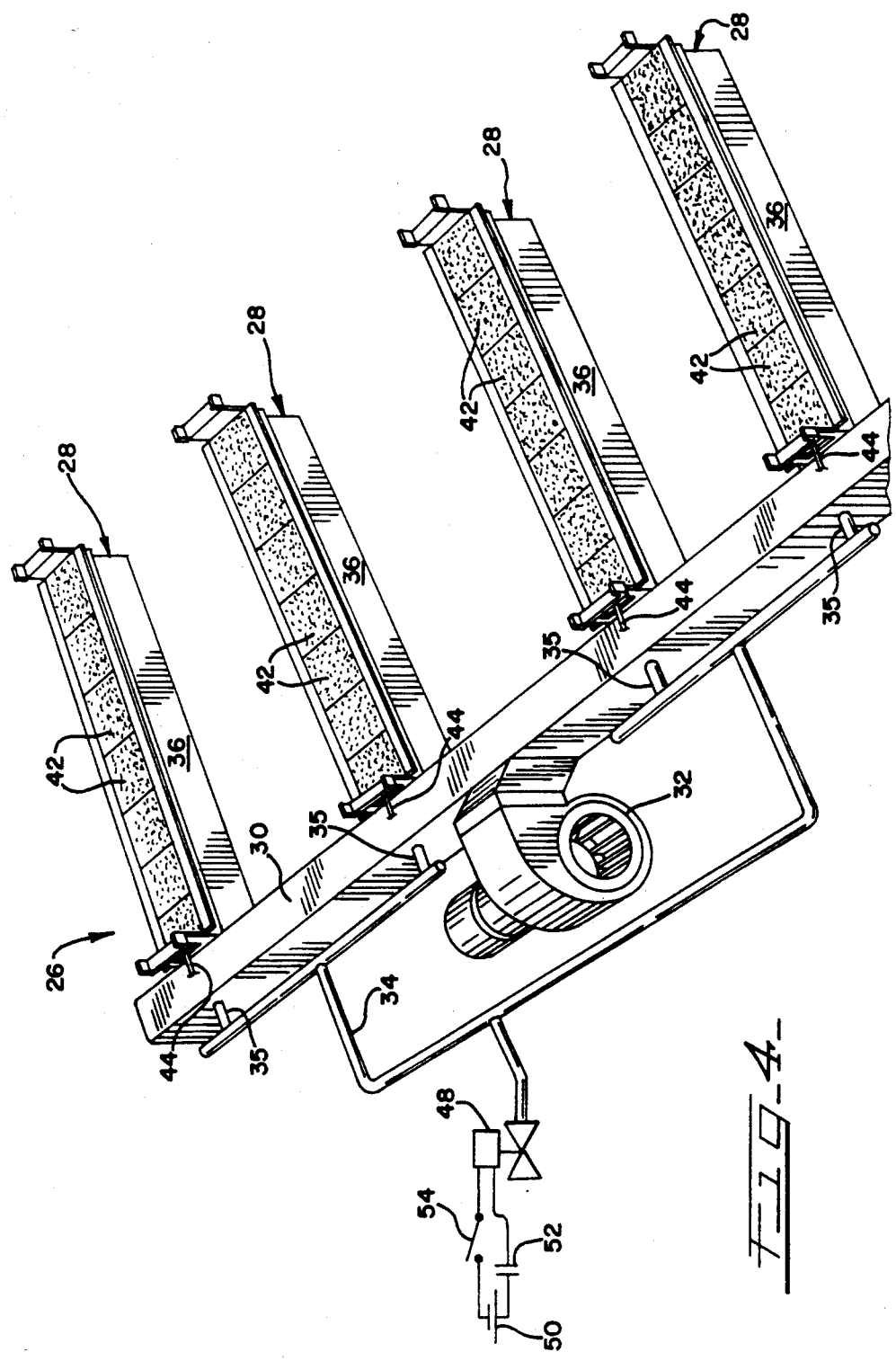

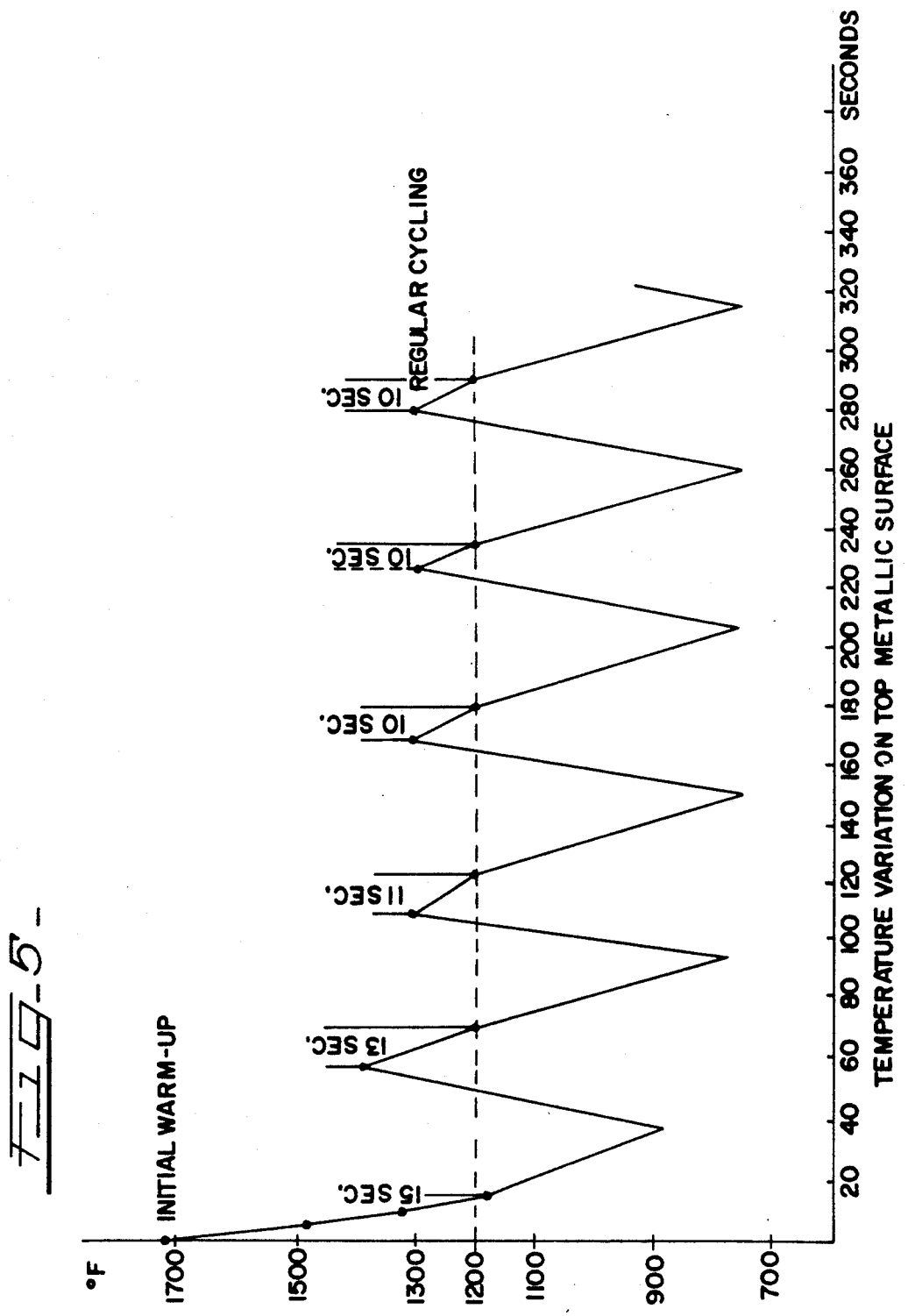

AUTOMATED OVEN WITH GAS-FIRED RADIANT HEATER ASSEMBLY

TECHNICAL FIELD

The present invention relates generally to automated, conveyorized ovens such as for cooking food products, and more particularly to an automated, conveyorized oven including a gas-fired radiant heater assembly having metallic combustion surfaces, with the heater assembly configured to operate responsively to thermal demands without undesirable flashback combustion.

BACKGROUND OF THE INVENTION

The food service industry requires ovens which provide consistent and efficient heating and cooking of food products. To this end, efforts have been made to employ gas-fired radiant heaters having refractory or ceramic heating elements. However, because of inherent limitations of this type of heater construction, efforts to use this type of heater for food preparation have heretofore met with, at best, limited success.

A conventional gas-fired radiant burner or heater uses an unglazed pottery refractory or ceramic material as the radiating element. The material is heated to a high temperature by combustion of a gas/air mixture at the surface of the material.

The radiating element of refractory material is foraminous in nature, but the multitude of holes thus defined by the element seriously compromises its mechanical strength. As a consequence, such refractory radiating elements are easily broken during assembly on a mass production basis, during transportation of the finished heater unit, or by rough handling by a user of the unit who does not take proper care in handling the fragile material.

The fragile nature of the refractory material can also result in breakage as a result of differential thermal expansion. For example, the radiating element can be broken due to internal stress if, during use, it comes in contact with a cold substance such as water.

The manner in which the usual ceramic or refractory radiating elements normally function further detracts from their versatile and convenient use. In a typical radiant burner apparatus using ceramic radiating elements, a suitable number of ceramic plates are provided with an appropriate number of flame holes defined by the plates to provide the desired heat output. Typically, each ceramic plate is about 5.375 inches by 3.75 inches, and about one-half inch thick. In a typical arrangement, each ceramic plate is formed with about 4,000 holes, each of about 0.050 inches in diameter, whereby about 37% to about 45% of the surface area of the plate is open.

In operation, combustible gas is jetted through a nozzle and is mixed with primary combustion air which is drawn in by the jet stream of gas, or is forced in by a powered blower. Ordinarily, the combustible gas/air mixture is introduced into the burner body through a venturi-type mixing tube, and released into the atmosphere through the small holes bored in the ceramic plates fitted to the upper face of the burner body.

Following ignition of the combustible mixture, gas combustion takes place on the surface of the plate. The flame becomes stable as the surface temperature of the ceramic plate is gradually elevated, and the combustion reaction begins to take place in a layer several thousandths of an inch inside the surface of the plate. This layer is held stationary as long as heating from the surface of the plate, and cooling by the gas/air mixture, are balanced. Radiant heat energy is emitted from the surface of the hot plate.

Difficulties can occur when the gas input increases in a manner which results in excessive elevation of the plate surface temperature, resulting in the gas/air mixture starting to burn at a relatively deep point in the flame holes, thus inducing combustion flashback upstream of the outer surface of the plates. Radiant efficiency as low as 50% is the maximum that can be expected to be obtained because of significant heat loss which is caused by the absorption of heat by the gas mixing tube through the back wall of the ceramic plates.

Because of the nature of the ceramic material, and the requisite formation of a number of flame holes, very little versatility is possible relating to the physical configuration of the plates. Cylindrical or other irregular shapes are virtually impossible to form. The relatively small mechanical strength of the ceramic material further complicates handling of the plates during transportation and assembly.

Heretofore, the use of radiant heater assemblies including ceramic plates for preparation of food products has not been successful due to the inevitable clogging of the flame holes in the ceramic plates with grease and other food debris. Moreover, the ceramic plates exhibit a relatively high degree of thermal inertia, and therefore are not suitable for those applications requiring precise temperature control where the application of heat is required in response to rapid temperature variations.

In view of the foregoing, efforts have been made to replace the typical ceramic or refractory radiating elements with metallic plates. However, such efforts have also been unsuccessful principally because of the problems associated with flashback combustion.

Specifically, in a conventional application, the combustible gas/air mixture ignites above the top surface of the burner. Because of the high temperature to which metallic radiating elements are subjected, on the order of 1,700°-1,800° F., interruption of the gas/air mixture for a period on the order of 3-5 seconds, followed by resupply of the mixture, inevitably results in flashback combustion upstream of the outer radiant surface of the metallic plates. It is believed that this flashback takes place because the combustion gas is reignited by contact with the very hot metallic radiating elements, thus resulting in combustion taking place below the surface or otherwise within the heater assembly, instead of on top of the metallic surface.

The present invention seeks to overcome the various deficiencies associated with radiant heater assemblies employing refractory or ceramic radiating elements, and to further address the shortcomings associated with previous arrangements employing metallic radiating elements in gas-fired radiant heaters.

SUMMARY OF THE INVENTION

An automated, conveyorized oven for heating food products in accordance with the present invention has been particularly configured for efficient, consistent, and cost-effective operation. These desirable goals are achieved by employing a gas-fired radiant heater assembly including metallic radiant heating elements. Notably, the controls for the heater assembly are operable to prevent flashback combustion upstream of the surface of the metallic elements, by permitting the elements to cool sufficiently after interruption of the heater gas supply, and before gas is resupplied to the assembly. In the preferred, illustrated embodiment, this is achieved by the provision of a timer mechanism in the controls which is operable to provide a predetermined time interval between interruption and resupply of gas to the heater assembly, thereby preventing flashback combustion.

As will be appreciated, a radiant heater assembly configured and operable in accordance with the principles disclosed herein can be used in applications other than the illustrated automated, conveyorized oven, including applications other than food preparation equipment.

In accordance with the illustrated embodiment, the present oven comprises an oven housing defining opposed, open ends, with a conveyor extending through the housing between the open ends for conveying food products through the oven.

In accordance with the present invention, the oven includes a gas-fired radiant heater assembly preferably positioned in the oven housing beneath the conveyor for heating food products on the conveyor. In the preferred form, the heater assembly comprises a plurality of radiant heater units positioned in spaced relationship to each other along the length of the conveyor.

Each heater unit comprises a generally elongated heater housing, and metallic radiant heating elements positioned along the upper surface of the heater housing. The heating elements are provided in the form of perforate metallic plates, preferably stainless steel, with combustion taking place at an outer surface of the metallic plates generating radiant heater by elevating the temperature of the heating elements.

As discussed above, previous radiant heating devices employing metallic heating elements have exhibited significant operational drawbacks associated with flashback combustion, i.e., combustion of the gas/air fuel mixture taking place upstream of the outer surface of the metallic heating elements. The heater assembly embodying the principles of the present invention specifically addresses this operational shortcoming by providing a control system which operates to prevent such flashback combustion. The controls function to permit the metallic heating elements to cool sufficiently after interruption of gas supplied to the heater assembly before gas is resupplied thereto. In the illustrated embodiment, the flashback-preventing arrangement is provided in a desirably straightforward manner, in that the controls include a timer mechanism which operates to provide a predetermined time interval between interruption and resupply of gas to the radiant heater assembly. The further provision of a thermostat responsive to the temperature in the oven permits efficient, versatile operation of the heater assembly with a high degree of responsiveness to fluctuating thermal demands.

Preferred features of the present radiant heater assembly facilitate its economical manufacture and efficient operation. In the preferred form, each of the heater units of the assembly comprises an elongated box-like heater housing within which extends a venturi for delivering the gas/air mixture to the combustion surface of each unit. While various arrangements for the perforate, metallic heating elements can be employed while keeping with the principles disclosed herein, a preferred arrangement includes at least one, and preferably a plurality, of pairs of vertically spaced perforate metallic plates. This arrangement has been found to desirably distribute and smooth the flow of the gas/air mixture as it flows from within the heater housing through the metallic plates for combustion at the outer surface defined by the upper, outer one of the plates.

Other features and advantages of the present invention will become readily apparent from the following detailed description, the accompanying drawings, and the appended claims.

BRIEF DESCRIPTION OF THE DRAWINGS

FIG. 2 is a cross-sectional view taken generally along lines 2—2 of FIG. 1;

FIG. 3 is a cross-sectional view taken generally along lines 3—3 of FIG. 1;

FIG. 4 is a diagrammatic view illustrating the radiant heater assembly embodying the principles of the present invention; and FIG. 5 is a graphic illustration of the thermal characteristics of the metallic heating elements of the present invention.

DETAILED DESCRIPTION

Figure 1:
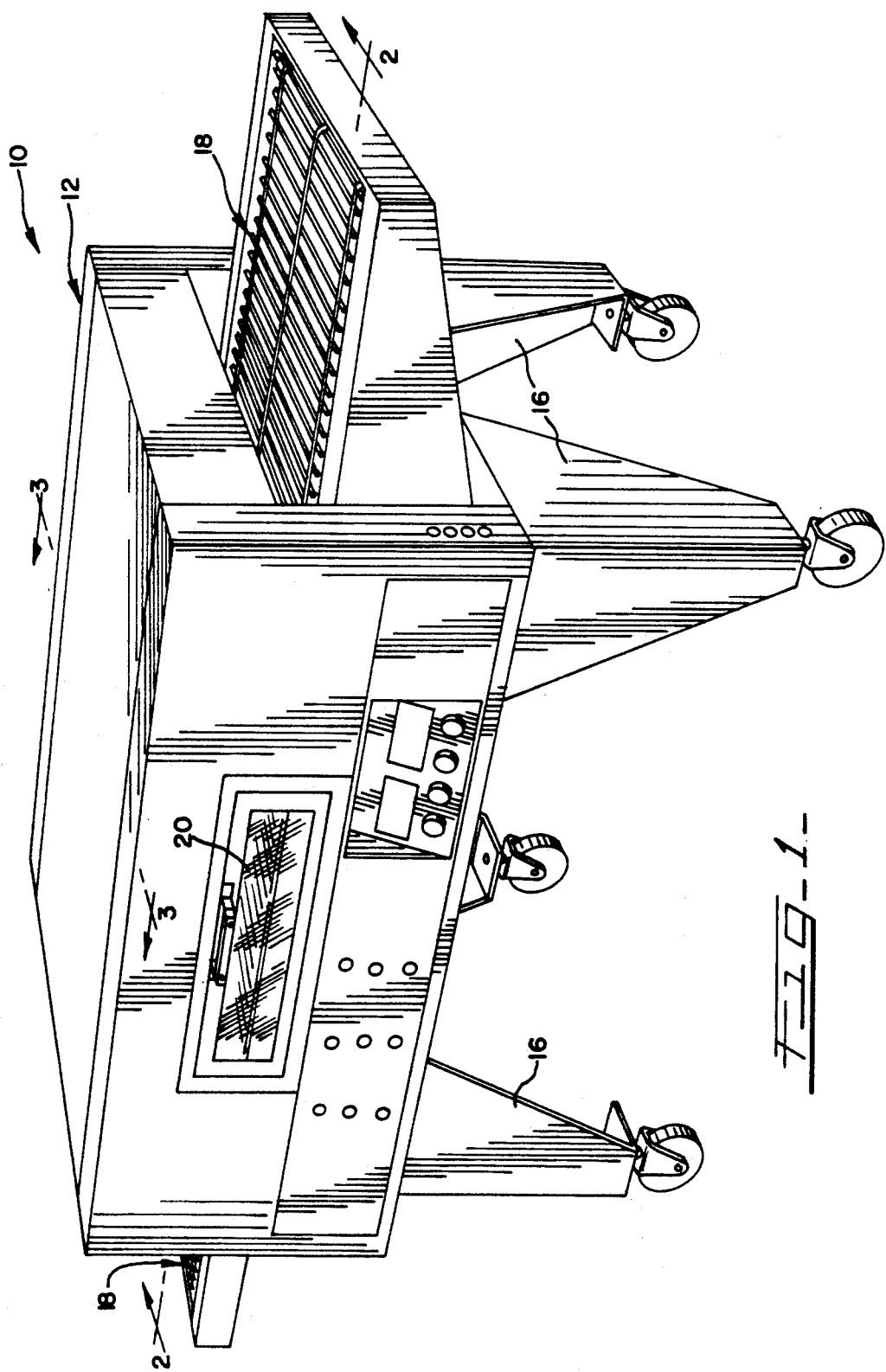
FIG. 1 is a perspective view of an automated, conveyorized oven including a radiant heater assembly embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, therein is illustrated an automated, conveyorized oven 10 which, as will be further described, includes a gas-fired radiant heater assembly embodying the principles of the present invention. While the present radiant heater assembly is particularly suited for use in this type of conveyorized oven, it will be recognized that the versatile operation of the present heater assembly facilitates its use in other applications, including applications apart from preparation of food products.

As illustrated in FIGS. 1-3, the conveyorized oven 10 includes an oven housing 12 defining opposed, open ends. The oven housing is preferably formed from a suitably durable metallic material, with insulation 14 providing the desired retention of heat within the oven chamber defined by the housing. A wheeled frame 16 supports the housing.

A conveyor 18 extends through the housing 12 between the open ends thereof for conveying food products through the oven. A window 20 in the side wall of the oven housing facilitates inspection of food products being conveyed therethrough, with the window 20 preferably configured for opening to facilitate access to the interior of the oven, if desired.

As illustrated in FIGS. 2 and 3, the oven housing 12 preferably defines an exhaust outlet 22 in the side wall thereof opposite window 20. In order to facilitate browning and further cooking of food products being conveyed through the oven, the oven optionally includes a plurality of upper heater elements 24 positioned in spaced relationship along the length of conveyor 18 above the conveyor. The heater elements 24 preferably comprise suitable electrical heater elements, although other arrangements can be employed.

With further reference to the drawings, and particular reference to FIG. 4, a radiant heater assembly 26 embodying the principles of the present invention is illustrated. For use in the oven 10, the heater assembly 26 includes a plurality of radiant heater units 28 which are positioned in spaced relationship to each other along the length of the conveyor 18 of the oven. As best illustrated in FIG. 4, the heater elements 28 are each operatively connected with a common fuel supply manifold 30, with the manifold 30 being supplied with air from a continually operable blower 32. A gas manifold 34 is operatively connected with the manifold 30, via gas inlets 35, for providing the desired gas/air mixture to the heater units 28.

The configuration of each heater unit 28 facilitates its economical manufacture and reliable operation. Each heater unit includes a generally box-like, elongated heater housing 36. Each unit further includes a generally elongated venturi 38 which extends within the respective one of the heater housings 36 and defines an opening into the housing at the free end of the venturi. As best shown in FIG. 3, each venturi 38 preferably is provided in the form of a "tube within a tube", whereby the desired venturi-effect is achieved by the use of a relatively economical structure. Each heater unit also preferably includes a flow reversing baffle 40 at one end of the heater housing 36, with the flow of gas/air moving from within manifold 30, through the venturi 38, and against the baffle 40 so that the combustible gas/air mixture is directed generally toward the upper portion of the heater housing.

In accordance with the present invention, metallic radiant heating elements 42 are provided along the upper surface of the heater housing 36. Pilot jets 44, or like ignition means, are preferably provided at the heating elements of each heater unit. As illustrated, a pair of upwardly extending brackets can be provided at respective opposite ends of each heater unit for receiving a metallic plate above the combustion surface of each unit. The optional use of such plates permits the heater units to be used to generate long wave infrared heat.

The specific configuration of the metallic radiant heating elements can be widely varied. In a presently preferred form, the elements are provided in the form of pairs of plates 42 preferably constructed of 24 gauge 304 stainless steel. Metallic plates 42 are perforate by the provision of perforations on the order of 0.045 inches in diameter. About 25% to about 45%, and preferably about 37%, of the surface of each plate is open for the flow of the combustible gas/air mixture therethrough. In a current embodiment, the upper and lower ones of the plates of each pair are spaced apart about one-half inch, with this arrangement having been found to desirably act to slow and distribute the combustible gas/air mixture as it flows to the outer surface of the upper plate for combustion.

In the preferred form, such even flow distribution of the combustible gas/air mixture is further promoted by the provision of flow-control baffles 43 (FIG. 3) which depend from the pairs of metallic radiating plates 42 above the venturi 38, and downstream of flow-reversing baffle 40. In the illustrated embodiment, a pair of the baffles 43 are provided in each heater unit, with the one of the baffles 43 positioned more closely to the free end of the venturi and to the baffle 40 extending downwardly a shorter distance (i.e., about 0.25 inches) than the baffle 43 spaced further from the baffle 40 (which baffle 43 extends downwardly about 0.5 inches). This arrangement of the baffles 43 promotes gradual flow control, inducing turbulence as the gas/air mixture flows along the lower plates 42, thereby assuring even distribution of the gas/air mixture to all of the plates 42.

During development of the present invention, the problems associated with flashback combustion, i.e., combustion taking place upstream of the surface of the outer, upper metallic plates 42, were extensively studied. In this regard, it was determined that flashback combustion would occur attendant to interruption, and then resupply, of gas to the burner assembly when the temperature of the metallic surface of the upper plate 42 was over 1,200° F.

Accordingly, it was determined that the problems of flashback could be avoided by assuring that the metallic radiant heating elements cool sufficiently after interruption of the gas supply, and before gas is resupplied to the burner assembly. Notably, the continual supply of air provided by the continually operable blower 32 of the illustrated embodiment facilitates cooling of the metallic radiating elements between periods of combustion.

To prevent flashback, the heater assembly 26 includes a control arrangement for operating the solenoid gas supply valve 48 through which gas is supplied to the gas manifold 34. A suitable power supply 50 operates the control circuit, with a thermostat 52 operating the burner assembly responsively to the temperature within the oven 10.

Because of temperature gradients which can sometimes exist within the cavity of the oven 10, the thermostat 52 preferably operates in response to temperatures in the oven as sensed by a plurality of thermocouple temperature sensors 55. As illustrated in FIG. 2, at least one, and preferably a pair, of sensors 55 are positioned between adjacent ones of the heater unit 28 beneath conveyor 18, while at least another one of the sensors 55 is positioned in the oven above the conveyor. The signals from these plural sensors are combined, and averaged, for operation of the thermostat 52.

Significantly, the control arrangement further includes a desirably straightforward timer 54 arranged in series relationship with the power supply and thermostat for operation of the solenoid valve 48. The timer mechanism 54, which may comprise a typical commercially available time delay relay, acts to create a predetermined time interval whenever the supply of gas through the solenoid valve 48 is interrupted before the solenoid valve 48 can be operated to resupply gas to the gas manifold 34, and to the heater units 28.

FIG. 5 graphically illustrates the manner in which the timing arrangement of the control system for the heater assembly permits sufficient cooling of the outer metallic surface of the radiating elements, thereby preventing flashback combustion upstream of these normal combustion surfaces. FIG. 5 illustrates the temperature variation on the outer metallic surface such as at an upper one of radiating elements 42. After initial warm-up, and thermal stabilization of the heater assembly, regular cycling of the assembly shows that after interruption of the supply of gas and air to the heater units, the top metallic surface cools within about 10 seconds to below 1,200° F. It was thus concluded that by configuring the timer mechanism 54 to provide a predetermined time delay of 15 seconds, sufficient cooling of the outer radiating elements would be assured, thereby preventing flashback combustion.

While it is within the purview of the present invention to employ a control arrangement including other than the timer mechanism for assuring sufficient cooling of the metallic radiating surfaces, this arrangement is desirably straightforward and reliable. As will be appreciated, this arrangement permits the use of gas-fired radiant heater units including metallic radiating elements, which elements are believed to be more efficient, and exhibit greater thermal responsiveness, than heretofore employed ceramic or refractory elements. Considered in conjunction with the very substantially greater ruggedness and durability of the metallic elements, compared with refractory or ceramic materials, as well with the manner in which the metallic material can be readily fabricated to various forms, it will be appreciated that a greatly improved radiant heater assembly is provided by the present invention.

With further reference to the illustrated form of the present invention, in accordance with a current embodiment thereof, a heater assembly 26 including four of the heater units 28 has been configured to provide total heat output of 120,000 BTU/hour, i.e., with each heater unit 28 providing about 30,000 BTU/hour. This is achieved with the provision of approximately 60 cubic feet/minute of air flow by the blower 32, with gas supplied via gas inlets 35 through respective orifices of about 0.093 inches. Pressure regulation of the gas supply is preferably effected to supply natural gas at a pressure of 3.5 inches of water, while liquified petroleum (lp) gas is supplied at a pressure of 10.5 inches of water. While it is possible to increase the amount of gas supplied to the heater units by increasing the gas pressure and/or the gas orifice sizes, it will be appreciated that commensurate adjustment of the air inlet openings into the venturis 38 is required. In the current embodiment, an air inlet opening into the venturis, from the manifold 30, are on the order of 0.625 inches. In the current embodiment, the dimension of the heating surface, provided by the upper or outer ones of the heating elements 42 of each heater unit 28, is about 3.875 inches by about 29 inches.

From the foregoing, it will be observed that numerous modifications and variations can be effected without departing from the true spirit and scope of the novel concept of the present invention. It is to be understood that no limitation with respect to the specific embodiment illustrated is intended or should be inferred. The disclosure is intended to cover by the appended claims all such modifications as fall within the scope of the claims.

What is claimed is:

1. An automated oven for heating food products, comprising:
    an oven housing defining opposed, open ends;
    conveyor means extending through said housing between the open ends thereof for conveying food products through said oven;
    gas-fired radiant heater means positioned in said housing beneath said conveyor means for heating food products thereon,
    said radiant heater means comprising a plurality of gas-fired radiant heater units positioned in spaced relationship to each other along the length of said conveyor means, each said heater unit comprising a heater housing, and metallic radiant means at an outer surface of which combustion takes place for generating radiant heat;
    each said heater unit further comprising venturi means extending within the respective heater housing, said venturi means of said heater units being joined to common manifold means, for receiving gas for combustion, said heater means including continually operable blower means for continually supplying air through said manifold means to the venturi means of the heater units; and
    control means for controlling operation of said radiant heater means, said control means being operable to prevent flashback combustion upstream of the surface of said metallic radiant means by permitting said metallic radiant means to cool sufficiently by the continual supply of air to said heater units, after interruption of gas supplied to said heater means and before gas is resupplied to said heater means.

2. An automated oven for heating food products in accordance with claim 1, wherein
    metallic radiant means of each said heater unit comprises at least one pair of perforate metallic plates arranged in vertically spaced relationship to each other, the outer, upper one of said plates providing the surface at which combustion takes place for generating radiant heat.

3. An automated oven for heating food products in accordance with claim 2, wherein
    said control means comprise time delay relay means operable to provide a predetermined time interval between interruption and resupply of gas to said heater means for preventing flashback combustion.

4. An automated oven for heating food products in accordance with claim 1, wherein
    each of said heater units comprises an elongated heater housing, with the respective venturi means extending within the elongated heater housing and defining an opening into the housing at a free end of the venturi means,
    each heater unit including flow-control baffle means positioned in the respective heater housing for distributing flow from the free end of the venturi means along the length of said heater housing.

5. An automated oven for heating food products in accordance with claim 4, wherein
    said flow control baffle means comprises at least one flow control baffle depending from said metallic radiant means above said venturi means.

6. An automated oven for heating food products in accordance with claim 1, wherein
    said control means comprises thermostat means for controlling said heater means responsively to the temperatures in said oven as sensed by at least one temperature sensing means positioned in said oven beneath said conveyor means between adjacent ones of said heater units, and as sensed by at least one temperature sensing means positioned in said oven above said conveyor means.

* * * * *